United States Patent [19]

Uesugi

[11] Patent Number: 6,154,814
[45] Date of Patent: Nov. 28, 2000

[54] CACHE DEVICE THAT REDUCES WAITING TIME NECESSARY FOR A GIVEN SUBSEQUENT REQUEST TO GAIN ACCESS TO THE CACHE

[75] Inventor: Takahiko Uesugi, Yamanashi, Japan

[73] Assignee: NEC Corporation, Toyko, Japan

[21] Appl. No.: 09/097,593

[22] Filed: Jun. 16, 1998

[30] Foreign Application Priority Data

Jun. 16, 1997 [JP] Japan .................................. 9-158577

[51] Int. Cl.[7] ...................................................... G06F 12/00
[52] U.S. Cl. ........................ 711/133; 711/138; 711/143; 711/152; 711/163
[58] Field of Search .................................. 711/138, 152, 711/163, 118, 133, 143

[56] References Cited

U.S. PATENT DOCUMENTS 5,454,093   9/1995   Abdulhafiz et al. ..................... 395/460

FOREIGN PATENT DOCUMENTS

| 0 304 587 | 3/1989 | European Pat. Off. . |
| 62-102344 | 5/1987 | Japan . |
| 4-15844 | 1/1992 | Japan . |
| 4-47350 | 2/1992 | Japan . |
| 4-293136 | 10/1992 | Japan . |
| 7-69863 | 7/1995 | Japan . |
| 8-221328 | 8/1996 | Japan . |
| 8-272608 | 10/1996 | Japan . |

*Primary Examiner*—Jack A. Lane
*Attorney, Agent, or Firm*—Foley & Lardner

[57] ABSTRACT

A cache device of the present invention has a path through which the desired data contained in block load data transferred from a main memory are delivered to a processing unit which required the desired data, even when cache access by an instruction for accessing the main memory results in a cache miss. This path is different from a path through which the desired data is read from a data array of the cache device when a cache hit occures. Namely, the path in question neither contains a path from the main memory to the data array nor a path from the data array to a general purpose register which the processing unit can refer to, and allows the desired data delivered from the main memory to be directly transmitted to the processing unit. The cache device, as soon as it finds the desired data out of block load data delivered from the main memory, writes them into the general purpose register by way of the path in question. The block load data delivered from the main memory are stored in a data buffer, and then written sequentially into the data array.

11 Claims, 4 Drawing Sheets

CACHE DEVICE THAT REDUCES WAITING TIME NECESSARY FOR A GIVEN SUBSEQUENT REQUEST TO GAIN ACCESS TO THE CACHE

BACKGROUND OF THE INVENTION

This invention relates to a cache device, particularly to a cache device connected between at least one processing unit and a main memory shared by a plurality of the processing units.

In a conventional cache device, when a load request to a main memory results in a cache miss, block data including the data indicated by the load request is fetched to the main memory. The block data returned from the main memory are written into the cache memory, and at the same time the desired data is so treated as to be sent back to a processing unit which issues the load request. In addition, to increase the handling capacity of cache, the device is provided with a non-blocking hardware mechanism by virtue of which the cache can manage, even when a cache miss occurs, subsequent load requests up to two requests.

Incidentally, a conventional information processing system, to increase its information processing capacity, is so constructed as to have its main memory shared by a plurality of processors, and with such system it often occurs that load requests from different processors must be handled at the same time. In such situations, namely, when processing requests from different processors compete with each other over the main memory, block load data moved from the main memory to the processor are not sent back in a sequential order, but haphazardly with the intervals between adjacent block data being not constant. To meet such situation, block load data are handled by smaller basic data units.

On the other hand, in the conventional cache device, an identical path acts at the same time as a reply data path through which target data contained in the block data delivered by the main memory is returned to a general purpose register, and as a read path through which, when cache contains the target data, that is, when a cache hit occurs, the required target data is read from the cache. Accordingly, when the cache device returns the target data contained in the block load data delivered by the main memory to the processing unit which issued the load request, the data from a data array becomes impossible because the involved path therefor has been taken over in competition. Thus, subsequent instructions to load data into the main memory are inhibited from accessing to the cache, and hence handling of subsequent instructions is interrupted, which will result in a lowered handling capacity of the cache.

For example, in the data processing system described in Japanese Unexamined Patent Publication No. 7-69863, a non-blocking hardware mechanism is incorporated which, even when successive load requests from a main memory encounter cache misses, ensures successive accesses to the memory. With this data processing system, an identical path acts at the same time as a reply data path through which target data contained in block data delivered by the main memory is returned to a general purpose register, and as a read path through which, when cache contains the target data, that is, when a cache hit occurs, the required datum is read from cache. Accordingly, when the cache device returns the target data contained in block load data delivered by the main memory to a processing unit which issues the load request, data from a data array becomes impossible because the involved path therefor has been taken over in competition. Thus, subsequent instructions to load data into the main memory are blocked for their access to cache, and hence handling of subsequent instructions is interrupted, which will result in a lowered handling capacity of cache.

FIG. 3 is a block diagram illustrating one example of the above-described conventional cache devices. In the figure, an instruction control unit 2 handles instructions one after another in order under the command of a program counter, and when a given instruction to be handled concerns fetching data from a main memory, it registers the address of main memory to be accessed into an EA (Effective Address) register 11.

The address to be registered into EA register 11 is constituted of three kinds of address data: one is an intra-block address which indicates the address within block data to be fetched, a second is a cache index address which determines the access address of cache using block data as basic units, and the third is a tag address which uses the cache capacity as a basic unit and employs an address exceeding the cache capacity as a search address.

The address of an address array 12 is utilized as an index by which a corresponding cache index address of EA register 11 is referred to. An address which has been obtained after a search through the address array 12 is compared with a corresponding tag address of EA register by a comparator 13. When it is found as a result of comparison that the two are identical, namely, when a cache hit occurs, it indicates that desired data is in the cache. When it is found that the two are not identical, namely, when a cache miss occurs, it indicates that desired data is not in the cache. The desired datum must be fetched from a main memory.

When a cache hit occurs, the tag data read from the address array 12 is compared with the corresponding tag data of EA register 11, and, when the two are identical, the hit result is delivered to a hit/miss register 14 for registration. At the same time, the cache index address of EA register 11 is registered into EA1 register 16.

Corresponding data of data array 22 are read with reference to the address of EA1 register, and a selector 23a selects desired data from data read from the data array 22, depending on the hit data provided by the hit/miss register 14, and places it in a register A 24. Then, the selected data is written through a register B 5 into a general purpose register 7a.

In the event of a cache miss, the tag data read from the address array 12 is compared with the corresponding tag data of EA register 11, and, when the two are not identical, the miss result is delivered to the hit/miss register 14 for registration. A start signal to fetch data from the main memory which is generated as a result of miss occurrence is delivered to an address control unit 3. Further, the addresses of data which are to be fetched as block data from the main memory are delivered from EA register 11 to the address control unit 3. The address control unit 3 converts the logic addresses into physical addresses, fetches block data from the main memory 4 and places them into a cache device 1a.

Within the cache device 1a, the selector 15a selects write addresses delivered through a signal line 31, and data received by a reply register 17 are written into the data array 22.

Incidentally, when a store instruction is delivered to the main memory to change the given data, and its original data is in cache, it is necessary to update the data in cache as well as that in the main memory. In such a case, the selector 15a selects a write address of EA register 11, and the selector 21a selects a corresponding write data of signal line 32, and writes it into the data array 22.

The main memory 4 is connected to the other information processing units, and, when access requests arrive from different units, competition for processing arises over the main memory. As a result, block load data returned from the main memory to the cache device will arrive in an irregular order.

To put it more specifically, because the aforementioned block load data are controlled in terms of basic data units (e.g., eight bytes), no restrictions are imposed on the order by which the block load data are returned to cache. Block load data returned to compensate for a request resulting in a cache miss occur as a cluster of eight reply data, and the cluster comprising eight reply data contains desired data (to be referred to as target data hereinafter) to be written into the general purpose register 7. When the target data is returned from the main memory 4, it is received temporarily by the reply register 17, and written via registers A 24 and B 5 into the general purpose register 7a.

With a conventional cache device, even when returning of block data from the main memory to cache requires a long time, cache busy signals are continuously asserted to arrest the handling of subsequent cache access requests, from the time when the cache receives the first reply unit data to the time when it receives the last reply unit data, for avoiding difficulties involved in handling of those subsequent cache access requests.

FIG. 4 is a timing chart representing the operation of cache device 1a described above. At the timing 1, a request for data fetch from the main memory is dispatched by the instruction control unit 2 and judged to encounter a cache miss at timing 2, and the cache miss is registered into the hit/miss register 14. To counteract the cache miss, data must be fetched anew from the main memory, and to execute this, address conversion is performed by the address control unit 3, logical addresses are converted into physical addresses, and from corresponding addresses of the main memory 4, block load data are fetched.

Over at the main memory 4, competition with requests from other information processing units occurs, and thus the block load data return with their order disturbed. More specifically, data a3 returns at timing 9, data a2 at timing 10, data a5 at timing 13, data a1 at timing 17, data a6 at timing 18, data a4 at timing 22, data a7 at timing 23 and data a8 at timing 26.

As the target data, data al, returns at timing 17, it is registered to the register A 24 at timing 18, to the register B 5 at timing 19, and to the general purpose register 7a at timing 20.

In above sequence of events, as the block load data start to arrive from timing 9 onward, cache busy signals are continuously asserted from timing 9 until the whole block load data have been received by the cache. In this particular example, cache busy signals are relieved when timing 26 is reached.

On the other hand, a subsequent request for fetch of data from the main memory 4 arise at timing 12. Because the cache busy signal continues to be active from the timing 9 to the timing 26, the subsequent requests are ignored, and no request is not excuted until timing 27 when cache busy signals are relieved. At timing 27, cache search is practiced for one of the subsequent requests for data fetch from the main memory, and when it is found that there is a cache hit, the target data is read from the data array, and at timing 31 that data is written into the general purpose register 7.

The conventional cache device whose operation proceeds as described above has following problems. In a cache device incorporating a non-blocking mechanism which can manage, even when a cache miss occurs, subsequent memory access instructions without ignoring them, the desired data (the target data) contained in block data returned from the main memory to compensate for the cache miss must be written into the general purpose register 7. During this process, however, because the cache incorporates a non-blocking mechanism, at least one subsequent data fetch instruction may access the cache. At the timing when the subsequent data fetch instruction accesses the cache, the target data delivered from the main memory 4 and the data selected in response to the subsequent fetch instructions may compete for the path to the general purpose register. To avoid such inconvenience, in such a case, cache access by any subsequent data fetch instruction is inhibited, and the registration of target data in the block data fetched from the main memory is allowed to take a precedence. In this case, while the target data of the block load data is returned to the cache, access of the cache by subsequent instructions is inhibited, which leads to a lowered efficiency of memory access management.

The reason why such inefficient memory access will result lies in the fact that the cache is so constructed as to allow an identical path to act at the same time as a data path for data returned from the main memory, and as an access path when a cache hit occurs. Further, when block data returned from the main memory are directly stored in cache, it may happen that cache busy signals are activated continuously for a long time, and in the mean time execution of subsequent instructions for fetch of data from the main memory is halted. This is to prevent those subsequent instructions from getting access to the cache because data may arrive at the cache any time from the main memory.

SUMMARY OF THE INVENTION

The object of this invention is to provide, as a remedy for above problems, a cache device with which it is possible to reduce the time during which access of cache by data fetch instructions occurring after a cache miss must be inhibited, and thus it is possible to reduce the time necessary for the subsequent instructions to wait for their turn of cache access.

According to an aspect of the present invention, there is provided a cache device device connected between a processing unit and a main memory unit, the cache device comprising a holding means which holds block data partially transferred from said main memory unit and including desired data indicated by an instruction when cache access by said instruction results in a cache miss, said instruction is issued by said processing unit and instructs to access said main memory, a delivery means which delivers said desired data to said processing unit when said desired data is transferred from said main memory unit, and a control means which writes said block data into a data array when whole content of said block data is accumulated in said holding means, and inhibits cache access by one or more new instructions while said block data are written into said data array.

In an another aspect, the cache device of the present invention has a means which will return target data to the general purpose register in a shortest period through a bypass, if a foregoing request for fetch of data from the main memory encounters a cache miss, and subsequent requests for fetch of data from the main memory occur just at a timing when block data to compensate for the cache miss are returned to the data array, and thus allows writing of the data into the general purpose register to occur not only through a cache hit path but also through a path specially dedicated for block data returned from the main memory.

In an another aspect, the cache device of the present invention ensures the continuation of handling of subsequent requests for fetch of data from the main memory even when a cache miss occurs, and those requests appear at a timing when the fetch of data from the main memory to compensate for the cache miss takes place. To put it more concretely, as the cache device of the present invention has a data buffer to hold block data fetched from the main memory, and a bypass or a path through which writing of the block data into the general purpose register is achieved, it is possible for the block data to be written into the general purpose register without competing for access to the register.

To put it otherwise, the cache device of the present invention has a cache hit path and a cache miss pass separately so that data can be safely written into the general purpose register, and temporarily stores block load data returned from the main memory in an irregular order into the data buffer so that the data can be written later into cache without any interruptions. Through this arrangement it is possible for subsequent instructions for fetch of data from the main memory, even when they occur at a timing when block load data are returned from the main memory to cache, to get access to the cache.

BRIEF DESCRIPTION OF DRAWINGS

Other features and advantages of the invention will be made more apparent by the detailed description hereunder taken in conjunction with the accompanying drawings, wherein.

In the drawings, the same reference numerals represent the same structural elements.

DETAILED DESCRIPTION OF THE PREFERRED EMBODIMENTS

First, a first embodiment of the present invention is described below in detail.

Figure 1:
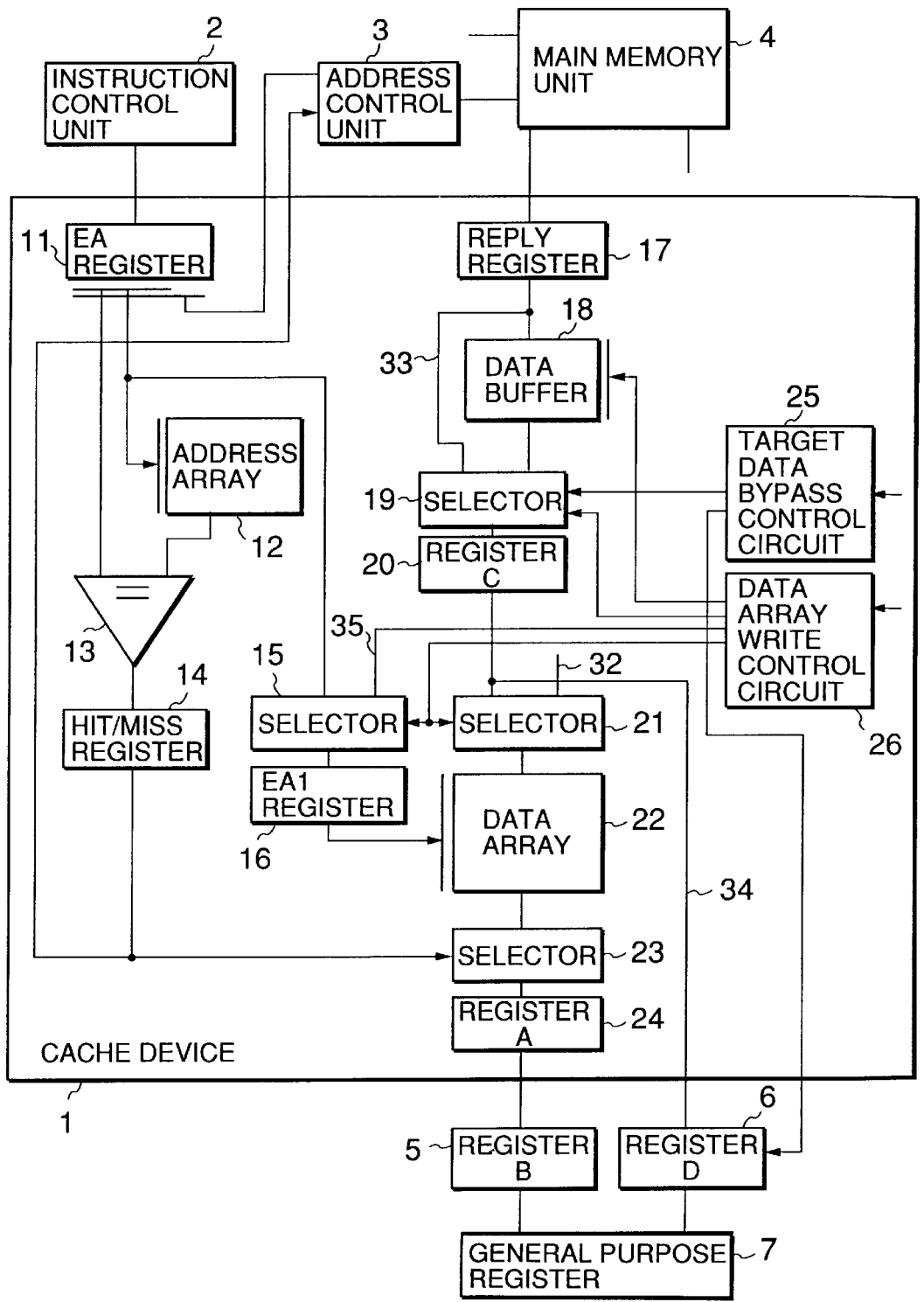
FIG. 1 is a block diagram representing one example of the present invention.

Refering to FIG. 1, a cache device 1 includes a data buffer 18, a first bypass 33, a selector 19, a second bypass 34, a first control means (a target data bypass control circuit 25), and a second control means (a data array write control circuit 26). The cache device 1, in response to an access instruction to a main memory issued by an instruction control unit 2, writes target data designated by the main memory access instruction into a general purpose register 7. The data buffer 18 holds data sent from the main memory 4. The first bypass 33 is a bypass through which data dispatched by the main memory 4 are sent directly to the selector 19 circumventing the data buffer 18. The selector 19 receives data sent from the data buffer 18 or data sent by way of the first bypass 33, chooses appropriate ones from them and dispatches them as an output. The second bypass 34 guides output dispatched by the selector 19 to the general purpose register 7. The first control means, the target data bypass control circuit 25, writes the target data into the general purpose register 7 by way of the first and second bypasses 33 and 34. The second control means, data array write control circuit 26, once whole block load data sent from the main memory 4 have been held in the data buffer 18, inhibits the execution of subsequent instructions for access to the main memory, and writes the block load data held in the data buffer 18 into the data array 22. The general purpose register 7 is a software visible register, and has input ports for data from the data array 22 and from the bypass 34.

The instruction control unit 2 processes instructions one after another in order under the command of a program counter. For brevity, description will be given assuming that this example comprises a set of one cache device 1 and one instruction control unit 2. In reality, however, a plurality of sets of the cache device 1 and the instruction control unit 2 are connected to a main memory 4. Futhermore, a plurality of the instruction control unit 2 may be connected to one cache device 1. The instruction control unit 2, when instructed to fetch data from the main memory, registers the addresses to be accessed in the main memory into an EA (Effective Address) register 11. The address to be registered into EA register 11 contains three kinds of address data: the first one is an intra-block address which indicates an address within block data to be fetched, the second is a cache index address which determines the access address of cache using block data as basic units, and the third is a tag address which uses the cache capacity as a basic unit and employs an address exceeding the cache capacity as a search address. The address of address array 12 is used as an index by which a corresponding cache index address of EA register 11 is referred to, and an address obtained after a search through the address array 12 is compared with a corresponding tag address of EA register by a comparator 13. When it is found as a result of comparison that the two are identical, namely, when a cache hit occurs, it indicates that desired data is in the cache. When it is found that the two are not identical, namely, when a cache miss occurs, it indicates that the desired data is not in the cache. The desired data must be fetched from the main memory.

When a cache hit occurs, the hit result is registered as a hit data into a hit/miss register 14. At the same time, the cache index address of EA register 11 is registered into EA1 register 16. Corresponding data of data array 22 are read according to said address registered into EA1 register 16, and the selector 23 selects the desired data from the data read from the data array 22 according to the hit data from the hit/miss register 14, and registers it into a register A 24. Later, the thus selected data is written into the general purpose register 7 by way of a register B 5.

When a cache miss occurs, the miss result is registered as a miss data into the hit/miss register 14, which, in response to the miss data, asserts a signal to the address control unit 3 so that fetch of data from the main memory may occur. In addition, EA register 11 sends to the address control unit 3 the addresses of main memory from which block data are to be fetched. The address control unit 3 translates the logical addresses into physical addresses, and delivery of block data from the main memory 4 to the cache device 1 takes place.

Incidentally, when a store instruction is delivered to the main memory to change a given data, and its original data is also in the cache device 1, it is necessary to update the data in the cache device 1 as well as that in the main memory 4 because the former is a copy of the latter. In such a case, a new write data to replace the old data is dispatched through a signal line 32 so that updating of the old data may take place.

The main memory 4 is constituted of a plurality of banks, and the banks are accessed by interleaving. The main memory 4 is connected to other information processing units, and when access requests from different units arrive competition for data fetch arises over the main memory 4. As a result, block load data transferred from the main memory 4 to the cache device 1 will appear in an irregular order. More specifically, because the aforementioned block load data are controlled in terms of basic data units (e.g., eight bytes), no restrictions are imposed on the order by which the block load data return to cache. Accordingly, the cache device 1 randomly receives eight reply data (let's assume eight for illustration), which constitute the block load data, in response to a cache miss request. The block load data constituted by eight reply data contains the desired data (the target data) to be written into the general purpose register 7. While the target data is being returned from the main memory 4, it is received once by a reply register 17, and is sent, under the instruction from a target data bypass control circuit 25, directly to the general purpose register 7 via a bypass 33 and selector 19. Namely, the target data, after having passed through the bypass 33, is written into the general purpose register 7 via a register C 20, bypass 34 and register D 6.

On the other hand, the cache device 1 stores the block load data in the data buffer 18 until whole contents of the block load data are accumulated therein. When storage of all involved data having been achieved, writes them into the data array 22. During this writing process, to prevent subsequent instructions for fetching data from the main memory from getting access to cache, cache busy signals are asserted.

Then, under the instruction from the data array write control circuit 26, the data are read from a data buffer 18, and further the selector 19 is instructed by the data array write control circuit 26 so as to select the data in question, to deliver them as output. The data array write control circuit 26 instructs a selector 21 to guide the data to the data array 22, and instructs another selector 15 so that addresses delivered through a signal line 35 may be registered into EA 1 register 16. Then, the same data array write control circuit 26, using the data of EA 1 register as addresses, writes the data delivered by the selector 21 into the data array 22. Cache busy signals to prevent cache from further being accessed are prepared as eight t sets because the block load data is constituted by eight units, and because each units is transfered per one t.

Then, an operation of the first embodiment is described below.

Figure 2:
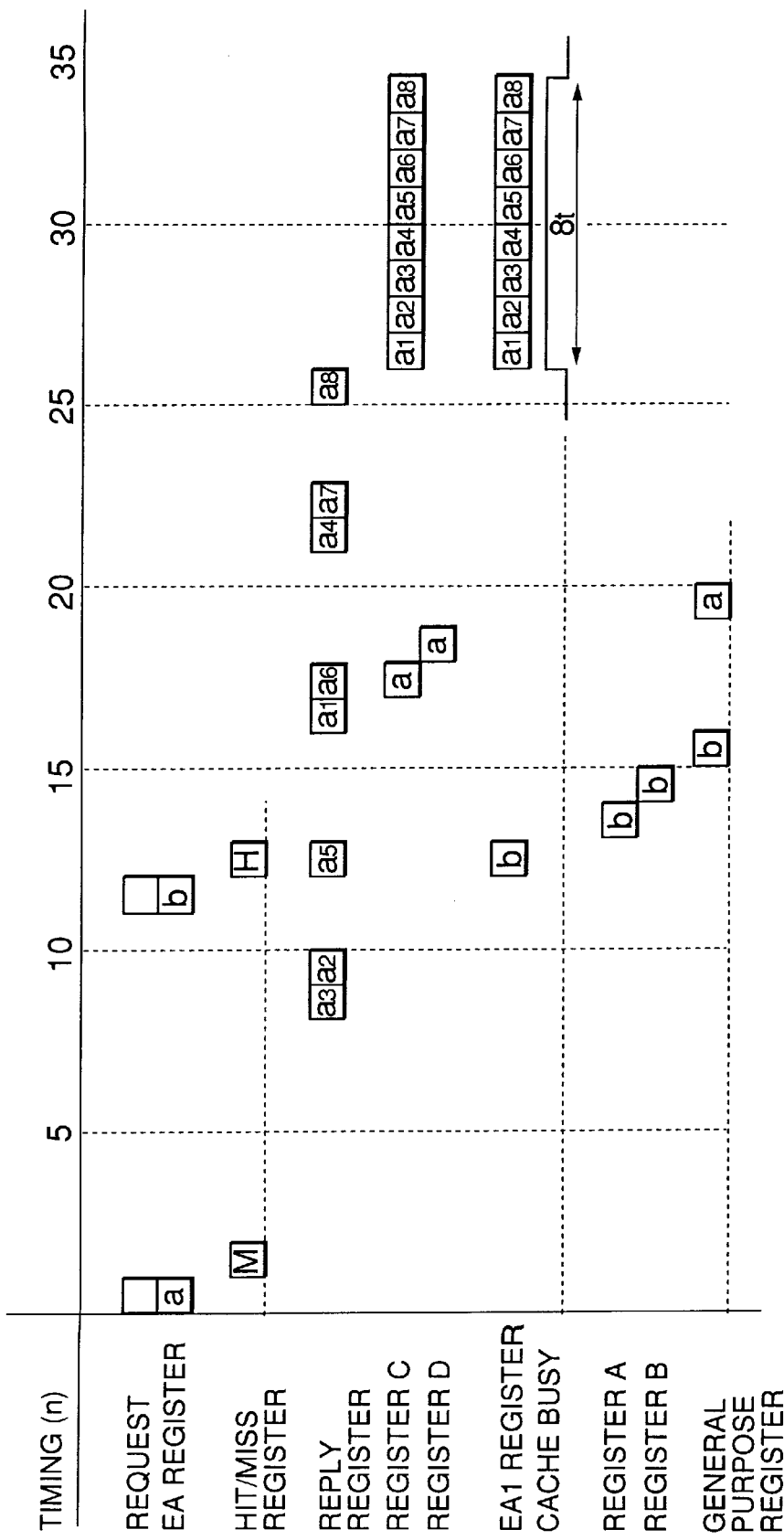
FIG. 2 is a timing chart illustrating the operation of the present invention.
Figure 3:
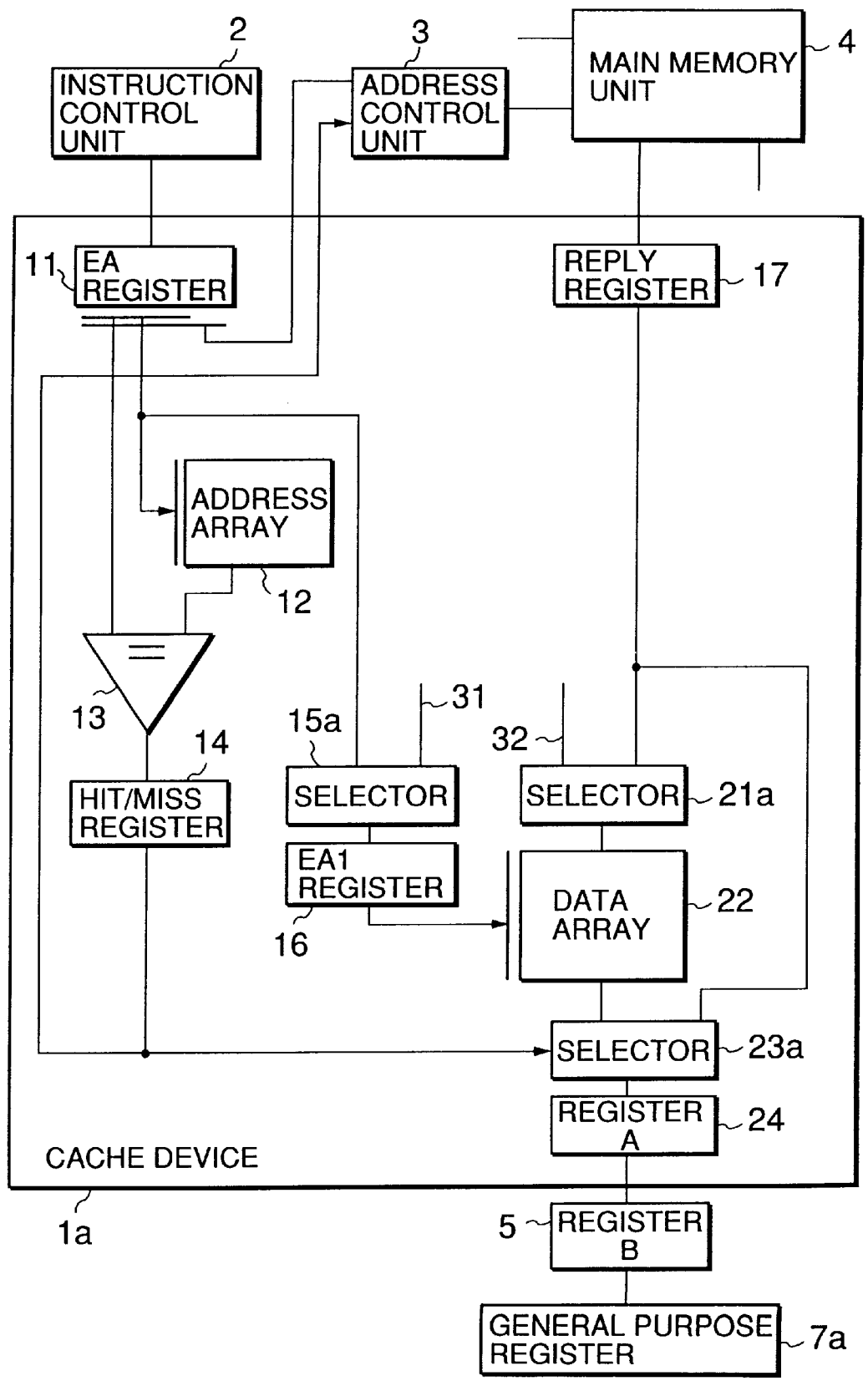
FIG. 3 is a block diagram representing a conventional cache device.

Referring to FIG. 2, at timing 1 a request for data fetch from the main memory is dispatched from the instruction control unit 2 and judged to encounter a cache miss at timing 2, and the cache miss is registered into the hit/miss register 14.

To counteract the cache miss, data must be fetched anew from the main memory, and to execute this, a logical address is converted into a physical address by the address control unit 3, and from the corresponding address of the main memory, block load data are fetched. Over the main memory 4, competition with requests dispatched by other information processing units occurs, and thus the block load data will return with their order more or less disturbed. With the same figure being referred to, data a3 returns at timing 9, data a2 at timing 10, data a5 at timing 13, data a1 at timing 17, data a6 at timing 18, data a4 at timing 22, data a7 at timing 23 and data a8 at timing 26 (let's assume a1 is the target data for illustration).

As the target data returns at timing 17, it is registered into the register C 20 at timing 18, into the register D 6 at timing 19,into the register D 6 at timing 19, and into the register 7 at timing 20.

As the entire block data return by timing 26, cache busy signals are set into play at timing 27, and the block load data are read sequentially from the data buffer 18. The thus read data are continuously fed to the data array 22 for storage. At timing 34, supply of data to the data array is completed, and thus cache busy signals are activated during the interval of 8t spanning from timing 27 to 34, and on cessation of the interval the signals are withdrawn.

A subsequent request for data fetch from the main memory appears at timing 12. At that time, cache busy signals are not yet activated, and thus in response to the request in question, a search for data in cache starts at timing 12. When the search results in a hit, desired data is read from the data array, and written into the general purpose register 7 at timing 16.

Figure 4:
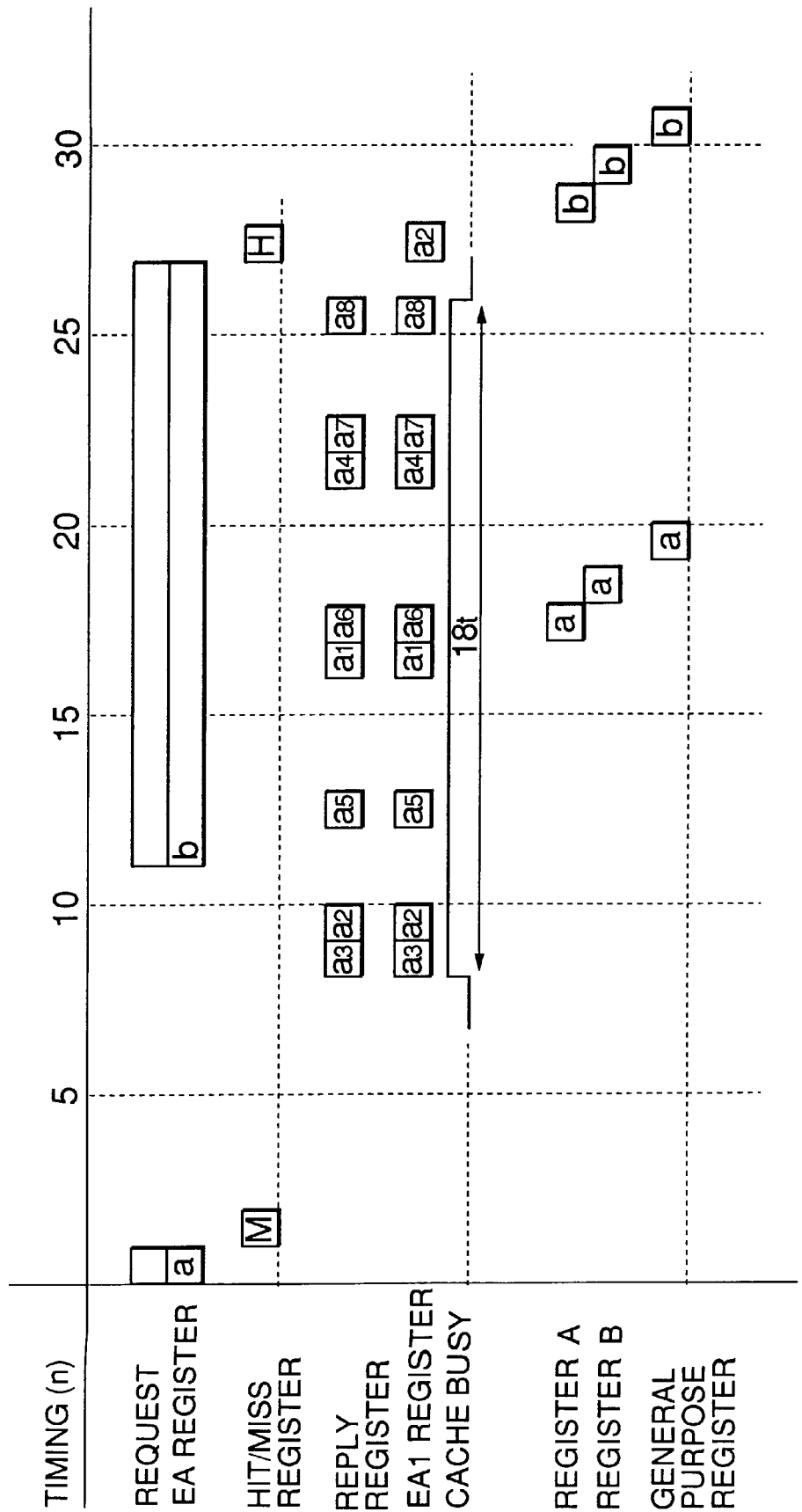
FIG. 4 is a timing chart illustrating the operation of a conventional cache device.

With the cache device operating in above-described manner, handing of both forgoing and subsequent requests for data fetch from the main memory is completed at timing 20, or earlier by 1it than is the case with the conventional device (see FIG. 4).

As detailed above, the cache device of the present invention can reduce the time during which, when a foregoing request encounters a cache miss, access to cache by subsequent requests must be blocked, and thus it is possible to reduce the time necessary for a given subsequent request to wait before it can gain access to cache. Namely, a return path through which pass block load data fetched from the main memory in response to a request for data fetch from the main memory is provided separately from a path through which data are read as a result of a cache hit, and the block load data, after having been temporarily stored in the data buffer, are written sequentially into the data array. This arrangement makes it possible to reduce the time during which cache busy signals must be activated. Accordingly, this cache device is advantageous in improving the information handling capacity of the overall information processing system.

While this invention has been described in conjunction with the preferred embodiments thereof, it will now readily be possible for those skilled in the art to put this invention into practice in various other manners.

What is claimed is:

1. A cache device connected between a processing unit and a main memory unit, said cache device comprising:
    a holding means for holding block data which is transferred from said main memory unit and which includes desired data indicated by an instruction when cache access by said instruction results in a cache miss, said instruction being issued by said processing unit and instructing to access said main memory;
    a delivery means for delivering said desired data to said processing unit when said desired data is transferred from said main memory unit; and
    a control means for controlling writing of said block data, being held by said holding means, into a data array when a whole content of said block data is accumulated in said holding means, and for inhibiting cache access by one or more new instructions while said block data, being held by said holding means are written into said data array.

2. The cache device as claimed in claim 1 wherein said block data comprise a plurality of data units which are randomly transferred from said main memory unit, and said control means successively writes said plurality of data units held by said holding means into said data array.

3. The cache device as claimed in claim 1 wherein said delivery means includes a bypass which circumvents said holding means.

4. The cache device as claimed in claim 1 wherein said delivery means includes a first bypass which circumvents said holding means, and a second bypass which circumvents said data array.

5. The cache device as claimed in claim 3, further comprising a selector for selecting the data outputted from said holding means when said block data is written into said data array, and for selecting the data delivered through said bypass when said desired data is delivered to said processing unit.

6. A cache device which continually executes access to a main memory unit by new instructions when a cache miss occurs, said cache device comprising:
   a buffer for holding block data transferred from said main memory unit; and
   a control means for writing said block data held by said buffer into a data array when a whole content of said block data is held in said buffer, and for inhibiting new accesses to said main memory unit while said block data is written into said data array.

7. The cache device as claimed in claim 6 wherein said block data comprise a plurality of data units which are randomly transferred from said main memory unit, and said control means successively writes said plurality of data units held by said buffer into said data array.

8. A cache device which writes a desired data into a general purpose register, said desired data designated by an instruction for accessing a main memory issued by a processing unit, said cache device comprising:
   a data buffer which holds block data containing said desired data transferred from said main memory when said desired data is found to be absent in a data array;
   a first bypass which circumvent said data buffer and through which said block data pass;
   a selector which selects either the data sent by said data buffer or the data sent through said first bypass;
   a second bypass which guides the data selected by said selector to the general purpose register;
   a first control means which writes said desired data into said general purpose register through the first and second bypasses; and
   a second control means which writes said block data held by said data buffer into a data array as soon as said data buffer holds the whole of said block data transferred from said main memory, and which inhibits execution of new instructions for access to said main memory while said block data are written into said data array.

9. The cache device as claimed in claim 8 wherein said first control means makes said selector select said data delivered through said first bypass when said desired data is transferred from said main memory unit.

10. A cache device connected between a processing unit and a main memory unit, said cache device comprising:
    a data buffer that holds block data which is transferred from said main memory unit and which includes target data indicated by an instruction when cache access by said instruction results in a cache miss, said instruction being issued by said processing unit and instructing to access said main memory;
    a selector connected to a first and a second bypass line and a target data bypass control circuit to deliver said target data to said processing unit when said target data is transferred from said main memory unit; and
    a data array write control circuit that controls writing of said block data, being held by said data buffer, into a data array when a whole content of said block data is accumulated in said data buffer, and that inhibits cache access by one or more new instructions while said block data, being held by said data buffer, are written into said data array.

11. A cache device which continually executes access to a main memory unit by new instructions when a cache miss occurs, said cache device comprising:
    a buffer that holds block data transferred from said main memory unit; and
    a data array write control circuit that writes said block data held by said buffer into a data array when a whole content of said block data is held in said buffer, and that inhibits new accesses to said main memory unit while said block data is written into said data array.

* * * * *